Aug. 5, 1952 — J. W. DANIELS — 2,605,495
FISH SKINNING MACHINE
Filed March 1, 1946 — 4 Sheets-Sheet 1

Inventor
JAMES W. DANIELS
By Clarence A. O'Brien
and Harvey B. Jacobson
Attorneys

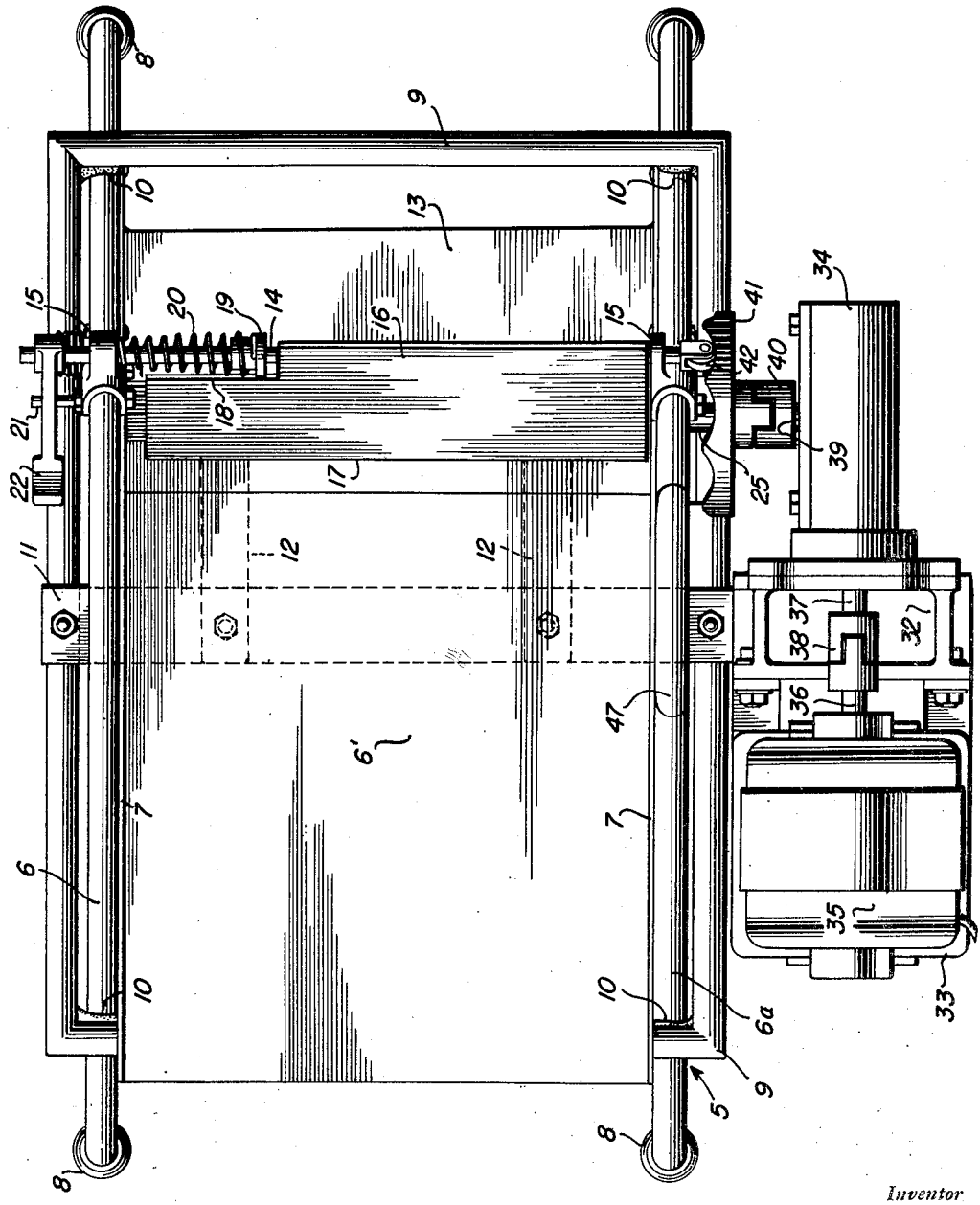

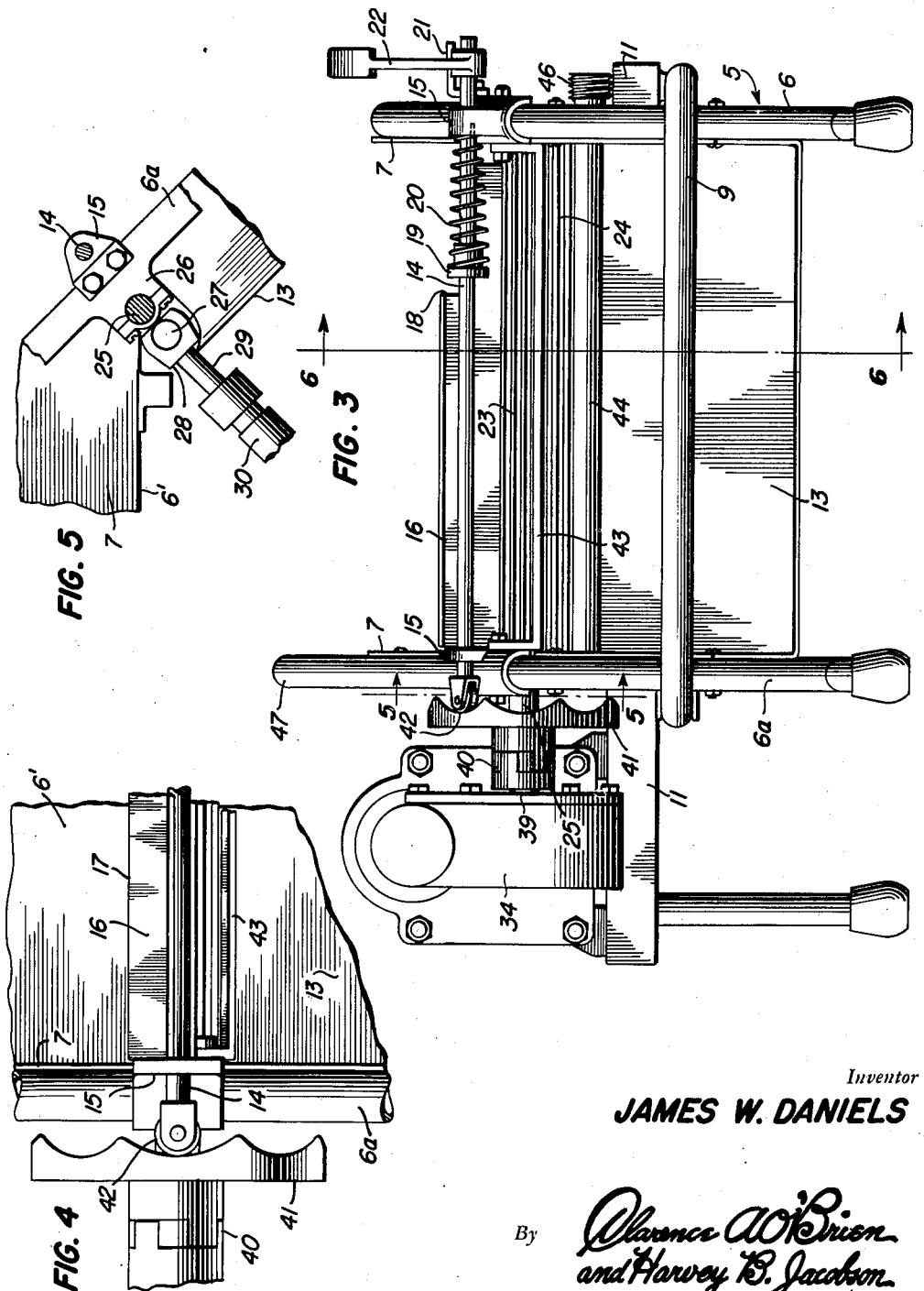

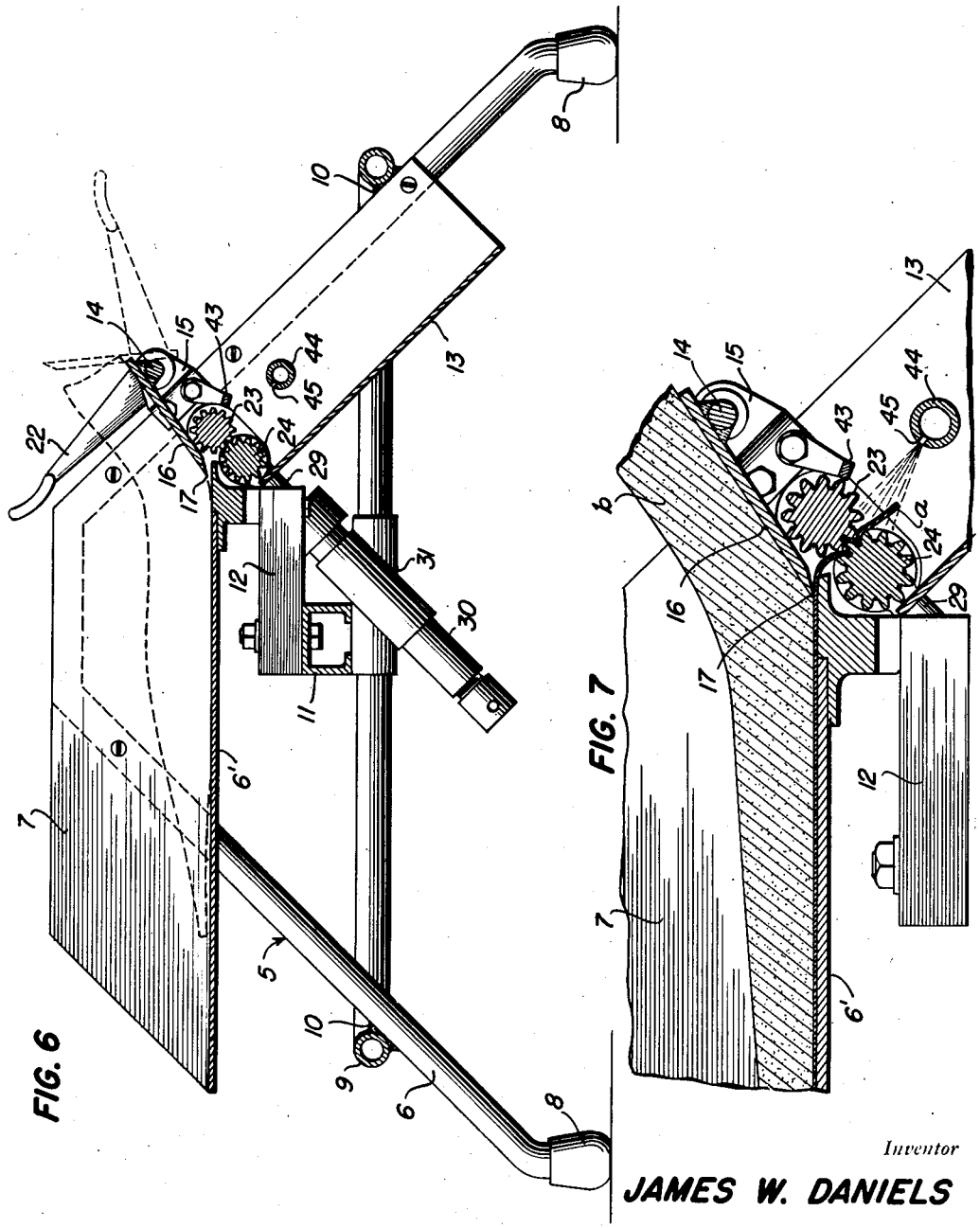

Patented Aug. 5, 1952

2,605,495

UNITED STATES PATENT OFFICE 2,605,495

FISH SKINNING MACHINE

James W. Daniels, Fort Myers, Fla.

Application March 1, 1946, Serial No. 651,087

4 Claims. (Cl. 17—2)

This invention relates to a machine for removing the skins from fish fillets.

The primary object of the present invention is to provide a simple and efficient machine of the above kind by means of which substantially only the skin may be removed from the fillets without the necessity of preliminary treatment of the fillets.

Another object of the invention is to provide a machine of the above kind by means of which substantially only the skins may be removed from the fillets even though the skins may vary in thickness.

Another object of the invention is to provide a machine of the above kind including a knife for severing the skins from the fillets, and means for continuously drawing the fillets to the knife so as to flatten the skin sides of the fillets as they approach the knife and thereby insure removal of substantially only the skins.

Still another object of the invention is to provide a machine of the above kind in which the fillets are drawn to the knife so that, as the skins are severed from the flesh, the flesh rides upwardly over the knife and presses and maintains the knife downwardly in proper position for severing substantially only the skins from the fillets.

A still further object of the invention is to provide intermeshing, longitudinally fluted feed rollers for continuously drawing the fillets to the knife, and adjustable pressure devices for forcing one feed roller toward the other so that the feed rollers tenaciously grip and positively feed the fillets to the knife without tearing the skin and causing interruption in the skinning operation.

Yet another object of the invention is to provide means for keeping the feed rollers clean and clear of flesh and foreign matter so that it will be unnecessary to repeatedly interrupt the skinning operation to clear and clean the feed rollers.

Still another object of the invention is to provide a readily portable machine of the above kind which may be conveniently carried from one place to another, and in which the weight of the machine is substantially balanced with respect to a carrying handle.

The invention further contemplates a machine of the above kind in which the knife is forwardly inclined and mounted for vertical swinging movement transversely of a feed bed, yieldable means being provided to swing the knife downwardly to operative position relative to the bed, adjustable means being provided for limiting the downward swinging movement of the knife in accordance with the thickness of the skin to be removed, and manually operable means being provided to swing the knife upwardly to facilitate sharpening of the knife and access to the feed rollers.

Other objects and features of the invention will become apparent from the following description when considered in connection with the accompanying drawings, and the invention consists in the novel form, combination and arrangement of parts shown, described and claimed.

In the drawings:

Figure 2 is a top plan view thereof.

Figure 3 is a rear elevational view of the same.

Figure 4 is an enlarged fragmentary view more clearly showing details illustrated in Figure 3 as seen looking forwardly and downwardly at the machine.

Figure 5 is a fragmentary detail view, taken substantially on line 5—5 of Figure 3.

Figure 6 is a vertical longitudinal section taken on line 6—6 of Figure 3.

Figure 7 is an enlarged fragmentary longitudinal section more clearly showing details illustrated in Figure 6 and also illustrating the manner in which the fish fillets are disposed on the bed of the machine and drawn to the knife.

Figure 1:
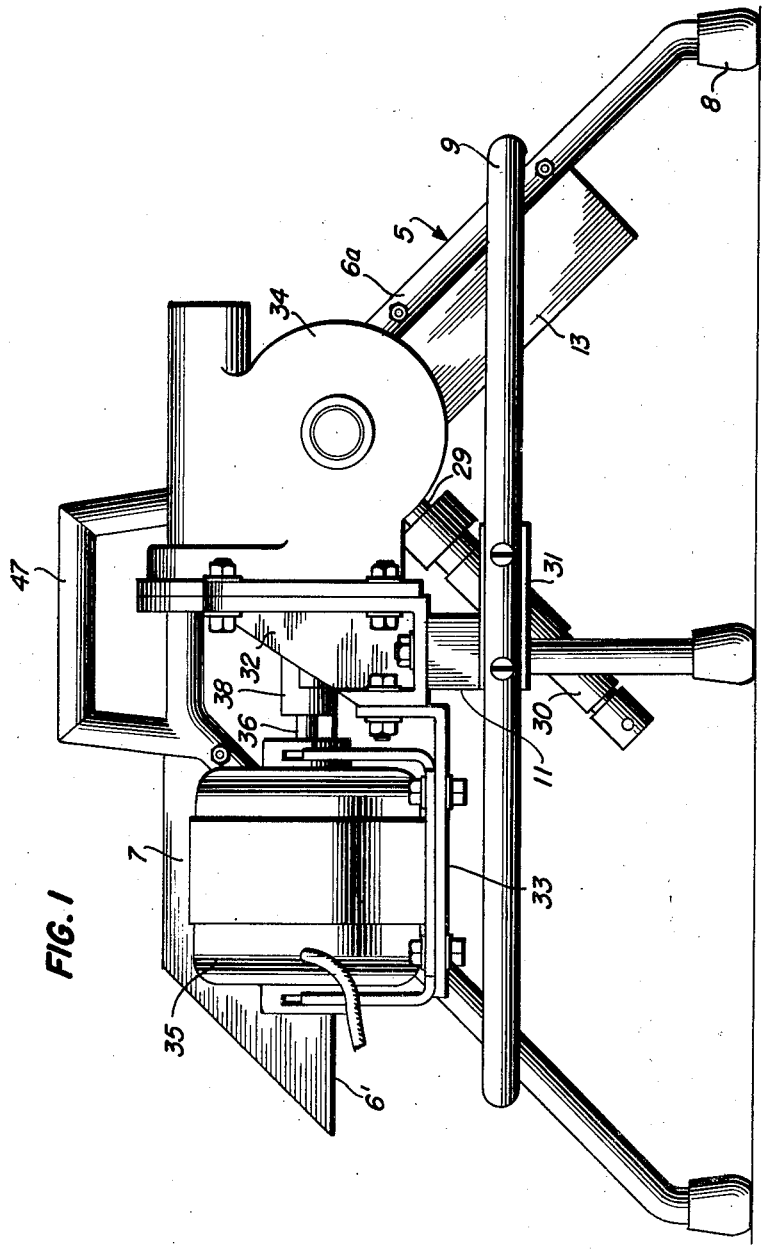
Figure 1 is a side elevational view of a fish skinning machine constructed in accordance with the present invention.

Referring in detail to the drawings, the illustrated embodiment of the invention includes a suitable frame 5 within the upper portion of which is rigidly mounted a substantially horizontal feed bed or table 6' having a plane upper surface and provided with upstanding side walls 7. As shown, the frame 5 comprises a pair of substantially similar side members 6 and 6a composed of rigidly connected downwardly diverging legs equipped at their lower ends with cushioned feet 8. The side frame members 6 and 6a are encompassed intermediate the top and bottom thereof by an open rectangular frame 9 which is secured to the legs of the frame members 6 and 6a at the points where it crosses said legs, as indicated at 10. Secured upon the frame member 9 intermediate its ends and beneath the bed 6' is a transverse beam 11, one end of which projects outwardly beyond the frame member 9 at the side of the machine where the side frame member 6a is located. The rear end of the bed 6' is bolted upon rearwardly projecting bracket bars 12 bolted or otherwise secured upon the beam 11.

A discharge chute 13 extends rearwardly and downwardly from the rear end of the bed 6', and is bolted or otherwise secured to the rearwardly extending legs of the side frame members 6 and 6a, the upper end of the bottom wall of chute 13 being extended beneath and spaced below the rear edge portion of bed 6' as shown in Figures 6 and 7.

Disposed a short distance rearwardly of and above the bed 6' is a transverse horizontal rock shaft 14 which is journaled in bearing brackets 15 secured on the rearwardly extending legs of frame members 6 and 6a. Rigidly attached near its upper back edge to the rock shaft 14 is a forwardly inclined knife 16 having a lower cutting edge 17 disposed in slightly spaced relation to and above the rear edge portion of bed 6'. The knife 16 extends substantially from side to side of the bed 6', but has one end spaced a short distance from the side wall 7 adjacent the frame member 6. At this end, the back edge of knife 16 is cut away as at 18 to expose the adjacent portion of shaft 14 and provide clearance for a collar 19 and a helical compression and torsion spring 20 disposed thereon. The outer end of spring 20 is anchored to the adjacent bracket 15, while the inner end of spring 20 is anchored to the collar 19. The arrangement is such that the spring 20 yieldingly resists movement of the knife 16 transversely of the bed 6' toward the frame member 6 and normally positions said knife 16 so that the end of the latter adjacent the frame member 6 is spaced inwardly of the latter. Also, spring 20 acts to turn the shaft 14 so as to swing knife 16 downwardly to its operative forwardly inclined position as shown in Figures 6 and 7. Downward swinging movement of knife 16 is properly limited by an adjustable stop pin 21 mounted on the frame member 6 and coacting with a hand lever 22 mounted on the adjacent end of shaft 14. Thus, adjustment of stop pin 21 will limit downward movement of knife 16 to position its cutting edge 17 at the required distance from the bed 6', according to the thickness of the skin to be removed from the fillets. Lever 22 is utilized to swing the blade 16 upwardly from the bed 6' so as to facilitate access to certain parts disposed beneath the knife and to permit access to the cutting edge 17 for sharpening the latter.

It will be noted that the fillets are placed skin side down upon the bed 6' and fed rearwardly to the knife 16 so that the skins are severed from the flesh with the skin a passing rearwardly of and under the cutting edge 17 and the flesh b riding rearwardly and upwardly across the knife 16. As will be presently described, the fillet is drawn to the knife by means of feed rollers mounted beneath the knife rearwardly of the bed and the cutting edge of the knife. By this drawing action, the fish side of the fillet is caused to flatten against the plane surface of the bed 6' as it approaches the cutting edge 17 of the knife, thus insuring removal of substantially only the skin from the fillet. This obviates any preliminary treatment of the fillet such as freezing it with the skin side in a flattened condition. It will be further noted that as the fillet is drawn rearwardly to the knife, the flesh portion b rides rearwardly and upwardly over the knife 16 so as to press downwardly on the latter and keep it in its proper or operative downwardly swung position so that substantially only the skin will be removed.

As previously mentioned, the means for drawing the fillets toward the knife consists of power driven coacting feed rollers 23 and 24 disposed directly beneath the knife 16 and directly behind the cutting edge 17 adjacent the rear edge of the bed 6'. These feed rollers are longitudinally fluted as shown and arranged so that they mesh with each other at a point below the plane of the upper surface of bed 6'. Thus, as the skin is severed from the flesh it passes rearwardly between the rollers 23 and 24 so as to be crimped and tenaciously gripped by said rollers. In this way, the fillets are forcibly drawn to the knife without danger of tearing the skins and by a pulling action upon the latter. Also, the pull is in a rearward and downward direction and results in causing the skin side of the fillet to flatten against the plane upper surface of the bed 6' as it approaches the cutting edge 17 of the knife 16. This has been found to efficiently bring about this action so that removal of substantially only the skin is uniformly insured without any special preliminary treatment of the fillets and even though the skin side of the fillets are normally of convex form in transverse section. It is preferred to regulate the gripping action of the rollers 23 and 24 upon the skin, according to the thickness of the latter. Accordingly, the shaft 25 of the upper roller 23 is journaled in bearings 26 fixed to the frame, while the shaft 27 of lower roller 24 is journaled in bearings 28 which are movable toward or away from the roller 23 as generally illustrated in Figure 5. The movable bearings 28 for the shaft 27 of lower roller 24 are carried by the plunger rods 29 of adjustable pressure devices 30, mounted at 31 upon the sides of the frame member 9. The pressure devices 30 may be of the spring or hydraulic type wherein the plunger rods 29 are projected under an adjustable force so that the degree of pressure exerted by the rollers against the skin may be properly regulated. In other words, the roller 24 is yieldingly urged toward the roller 23 by the devices 30, the force exerted by said devices being adjustable so as to regulate the grip of the rollers upon the skin a as said rollers crimp and pull the skin downwardly and rearwardly for feeding the fillets to the knife. In this way, feeding of the fillets to the knife may be successfully accomplished by a pulling action on the skin without danger of tearing the latter; the flutes of the rollers being rounded and comparatively broad surfaced so as to obviate any cutting or tearing action.

It is further noted that the rock shaft 14 is slidable longitudinally in the bearings 15 so that the knife 16 may be vibrated or reciprocated rapidly transversely of the bed 6' or parallel with the cutting edge 17 during the skinning operation. The purpose of reciprocating the knife is to facilitate the cutting or severing operation by means of which the skin is detached from the fish.

Power driven means is provided for driving the upper roller 23 and for reciprocating the shaft 14 so as to correspondingly reciprocate knife 16. At the side of the machine adjacent the frame member 6a and where the beam 11 projects, a bracket 32 is bolted upon the projecting end of beam 11 and has a motor mount 33 rigidly bolted to the forward side thereof. The casing of a worm reduction gearing 34 is rigidly bolted to the rear side of bracket 33, and an electric motor 35 is secured upon the mount 33 so that its drive shaft 36 extends rearwardly. The reduction gearing 34 has a drive shaft 37 connected to the drive shaft 36 of motor 35 by a suitable flexible coupling 38. The reduction gearing also includes a transverse driven shaft 39 which is connected with the shaft of roller 23 by a flexible coupling 40. Thus, the roller 23 is driven by motor 35 through a reduction gearing, and rotation of roller 23 is imparted to roller 24 due to the fact that these rollers mesh with each other.

A cam disc 41 is mounted on the shaft 25 of roller 23 adjacent the coupling 40, and the inner cam face of cam disc 41 is engaged by a roller 42 mounted on the adjacent end of shaft 14. Cam disc 41 is thus driven by motor 35 through the reduction gearing, and causes the shaft 14 to be rapidly longitudinally vibrated or reciprocated, in conjunction with the spring 20, as previously mentioned. More specifically, cam disc 41 causes intermittent movement of shaft 14 in one direction and spring 20 moves it in the opposite direction, the cam disc and spring acting alternately so as to bring about the rapid reciprocation of the knife.

In order to provide for continuous operation of the machine, it is necessary to keep the rollers 23 and 24 clear of skin, flesh and other foreign matter. In order to prevent the skin from winding about the roller 23, a clearer bar or blade 43 is mounted behind the roller 23 and extends parallel therewith adjacent the periphery of the same. In this way, the skin is peeled from the roller 23 if it tends to wind thereon. Flesh and other foreign matter are washed from the valleys between the ribs of the rollers 23 and 24 by jets of water discharged from a spray pipe 44 that is mounted transversely of the chute 13 directly behind and below the rollers. This spray pipe 44 has jet openings 45 disposed so that jets of water are projected upwardly and forwardly on to both rollers in a transverse zone within which the adjacent portions of the rollers are located. By supplying the water under sufficient force, the clearing and cleaning of the rollers is made effective so that it is rarely necessary to discontinue the skinning operation to remove foreign matter from said rollers. The spray pipe 44 is closed at one end and has its other end adapted as at 46 for connection with a suitable source of supply of water under pressure.

The frame member 6a is provided at the top with a handle 47 to facilitate carrying of the machine from one place to another. It will be noted that the parts disposed at the outer side of the frame member 6a include the relatively heavy motor 35 and reduction gearing 34. Thus, the weight of the machine is substantially evenly balanced at opposite sides of the frame member 6a and the handle 47 thereof. By reason of this fact, the machine may be conveniently carried in one hand and will be naturally balanced without any effort exerted by the person transporting the machine.

In operation, the motor 35 is caused to drive the rollers 23 and 24 and to effect rapid reciprocation of knife 16 with short strokes and parallel with its cutting edge. The attendant places the fillets skin side down upon the bed 6' and moves them rearwardly into engagement with the cutting edge 17 of knife 16 until a portion of the skin $a$ is severed from the flesh $b$ and passes between the rollers 23 and 24. The rollers then exert a rearward and downward pull upon the skin so as to complete the skinning operation of that particular fillet. This cycle of operation is repeated with each successive fillet, and during the skinning operation jets of water are continuously projected against the rollers so as to keep them clean and clear of foreign matter. It will be noted that the skin $a$ is gripped at spaced points between the rollers 23 and 24 and on spaced lines for the entire width of the skin. This, as well as the crimping action of the rollers on the skin and the broad rounded surfaces of the flutes of the rollers, eliminates any possibility of tearing the skin even though it be comparatively tender. The action of the knife is sufficiently rapid to avoid an unduly strong pull on the skin by the feed rollers such as might ordinarily cause tearing thereof. In this way, I am able to successfully feed the fillets past the knife by exerting a pulling action upon the skin immediately behind the point where the skin is severed from the flesh. Due to the downward and rearward pull exerted on the skin throughout the width thereof, the fillet is effectively flattened against the plane upper surface of the bed 6' so that the knife 16 will remove substantially only the skin and will thereby avoid the loss of flesh by leaving material portions thereof adhered to the skin.

From the foregoing description, it is believed that the construction, operation and advantages of the present invention will be readily understood and appreciated by those skilled in the art. The invention is susceptible of modification and various changes in details of construction, such as fairly fall within the spirit of the invention as claimed.

What I claim is:

1. In a fish skinning machine, the combination of a frame, a feed bed fixedly mounted in the frame and having a plane upper surface, a forwardly inclined knife mounted transversely of the feed bed adjacent the rear edge of the latter, said knife having a lower cutting edge spaced above said surface, means mounting said knife for vertical swinging movement and for reciprocation transversely of the bed, yieldable means for swinging said knife downwardly and for moving it transversely of the bed in one direction, means for limiting downward swinging movement of the knife to position its cutting edge above the surface of the bed a distance substantially equal to the thickness of the skin of the fillets, cam means for intermittently moving the knife transversely of the bed in opposition to said yieldable means, coacting power driven feed rollers mounted transversely of the feed bed beneath and immediately behind the knife for gripping the skin of each fillet as it is severed from the flesh and continuously drawing the fillet to the knife, and power means for driving said cam means and said feed rollers.

2. In a fishing skinning machine, the combination of a frame, a feed bed fixedly mounted in the frame and having a plane upper surface and a straight rear edge transverse to the direction of feed, a forwardly inclined knife mounted transversely of the feed bed adjacent the rear edge of the latter, said knife having a lower cutting edge located above said surface and spaced therefrom by a distance substantially equal to the thickness of the skin of the fillets passing therebetween, means mounting said knife for reciprocation transversely of the bed, coacting feed rollers mounted transversely of the feed bed beneath and immediately behind said rear edge for gripping the skin of each fillet as it is severed from the flesh and continuously drawing the skin downwardly over said rear edge and the fillet to the knife, means operable to reciprocate the knife including an actuating element, means including a motor and a reduction gearing mounted at one side of the frame for driving said actuating element and said rollers, and an upstanding handle carried by said side of the frame to facilitate carrying the machine, the weight of the machine being substantially equalized at opposite sides of said handle.

3. In a fish skinning machine, a stationary cutting plate having a horizontal plane upper surface, a knife having a horizontal cutting edge located above said surface by distance substantially equal to the thickness of a fish skin passing therebetween, traction rollers behind said knife edge having intermeshing longitudinal flutes with smooth rounded edges for gripping said skin and pulling it between said knife edge and said surface, means associated with said knife for reciprocating said knife relative to said surface, and means for lifting said knife out of cutting position.

4. In a fish skinning machine, the combination of a frame, a feed bed fixedly mounted in the frame and having a plane upper surface and a straight rear edge transverse to the direction of feed, a knife pivotally mounted above the feed bed on an axis extending transversely of the feed bed adjacent the rear edge thereof, said knife being forwardly and downwardly inclined with a lower cutting edge located above said surface and spaced therefrom by a distance substantially equal to the thickness of the skin of the fillets passing therebetween, means associated with said knife for reciprocating said knife relative to said surface, and coacting power driven feed rollers mounted transversely of the feed bed beneath and immediately behind said rear edge for gripping the skin of each fillet as it is severed from the flesh and continuously drawing the skin downwardly over said rear edge and the fillet to the knife.

JAMES W. DANIELS.

REFERENCES CITED

The following references are of record in the file of this patent:

UNITED STATES PATENTS

| Number | Name | Date |
|---|---|---|
| 1,279,134 | Man | Sept. 17, 1918 |
| 1,596,649 | Barry | Aug. 17, 1926 |
| 1,703,217 | Watson | Feb. 26, 1929 |
| 1,714,886 | O'Connor | May 28, 1929 |
| 1,867,133 | Bisset | July 12, 1932 |
| 1,936,688 | Rieske et al. | Nov. 28, 1933 |
| 1,975,044 | Kelly | Sept. 25, 1934 |
| 2,215,114 | Baader et al. | Sept. 17, 1940 |
| 2,254,969 | Lindsey | Sept. 2, 1941 |
| 2,455,831 | Townsend | Dec. 7, 1948 |
| 2,477,289 | De Moss | July 26, 1949 |